(12) United States Patent
Kobayashi

(10) Patent No.: US 6,322,222 B1
(45) Date of Patent: Nov. 27, 2001

(54) PAIR OF FOLDAWAY ORTHOGONAL MIRRORS AND FABRICATION METHOD THEREOF

(76) Inventor: Shigeki Kobayashi, 60 Nishinokishinoshita-cho, Yamashina-ku, Kyoto-shi, Kyoto 607-8352 (JP)

( * ) Notice: Subject to any disclaimer, the term of this patent is extended or adjusted under 35 U.S.C. 154(b) by 0 days.

(21) Appl. No.: 09/493,215

(22) Filed: Jan. 28, 2000

(30) Foreign Application Priority Data

Jan. 28, 1999 (JP) ................................................. 11-019528

(51) Int. Cl.⁷ .............................. G02B 5/08; G02B 7/182
(52) U.S. Cl. .......................... 359/855; 359/857; 359/862; 359/872; 359/900; 359/903; 248/467; 248/469; 248/472; 248/474
(58) Field of Search ..................................... 359/850, 854, 359/855, 856, 857, 858, 862, 865, 872, 900, 903; 248/467, 469, 472, 474

(56) References Cited

U.S. PATENT DOCUMENTS

| | | | | |
|---|---|---|---|---|
| 273,445 | * | 3/1883 | Blake ..................................... | 359/855 |
| 328,742 | * | 10/1885 | Wiederer ............................... | 359/854 |
| 370,623 | * | 9/1887 | Hooker .................................. | 359/856 |
| 505,127 | * | 9/1893 | Ranger .................................. | 359/855 |
| 813,136 | * | 2/1906 | Balch .................................... | 359/856 |
| 1,451,236 | * | 4/1923 | Stanfield ............................... | 359/854 |
| 1,855,095 | * | 4/1932 | Campbell .............................. | 359/855 |
| 2,036,184 | * | 4/1936 | Armstrong ............................ | 359/855 |
| 3,589,049 | * | 6/1971 | Cornelius . | |
| 3,684,380 | * | 8/1972 | Benchley, Jr. ........................ | 359/856 |
| 4,681,366 | * | 7/1987 | Lobanoff . | |
| 4,720,184 | * | 1/1988 | Watson ................................. | 359/856 |
| 5,357,377 | * | 10/1994 | Payne, Jr. et al. .................... | 359/855 |
| 5,430,578 | * | 7/1995 | Reagan ................................. | 359/856 |
| 5,625,501 | * | 4/1997 | Taggert ................................. | 359/862 |
| 5,810,419 | * | 9/1998 | Lam . | |
| 6,193,377 | * | 2/2001 | Spigner . | |

FOREIGN PATENT DOCUMENTS

| | | | | |
|---|---|---|---|---|
| 3921103 | * | 11/1990 | (DE) ..................................... | 359/855 |
| 0056968 | * | 8/1982 | (EP) ..................................... | 359/856 |
| 404113945 | * | 4/1992 | (JP) . | |
| 411046946 | * | 2/1999 | (JP) . | |
| 411216050 | * | 8/1999 | (JP) . | |
| 094020867 | * | 9/1994 | (WO) ................................... | 359/856 |

* cited by examiner

Primary Examiner—Ricky D. Shafer
(74) Attorney, Agent, or Firm—Smith, Gambrell & Russell, LLP

(57) ABSTRACT

A pair of folding orthogonal mirrors is disclosed, including first and second plates, each provided on a face thereof with a surface mirror; hinges, attached to the first and second plates to movably join the two together, so that the plates are movable from an unfolded position, in which the surface mirrors on each of the plates are arranged orthogonally, to a folded position, in which the surface mirrors on each of the plates face one another. The pair of folding orthogonal mirrors is provided with a magnet assembly, attached to the first and second plates, for maintaining the plates in the unfolded position by magnetic attraction; and include means for adjusting the angle between the surface mirrors in the unfolded position.

9 Claims, 9 Drawing Sheets

PAIR OF FOLDAWAY ORTHOGONAL MIRRORS AND FABRICATION METHOD THEREOF

BACKGROUND OF THE INVENTION

This invention relates to a pair of mirrors wherein two surface mirrors arranged orthogonally at right angles and wherein two surface mirrors dually reflect light that is incident from a viewer and present reversed mirror images in which the right and the left sides are correctly positioned as if the viewer were facing himself, and more particularly, to a pair of mirrors equipped with mechanisms enabling unfolding and folding of the mirrors through changes in the intersection angle thereof.

Prior orthogonal mirrors were disclosed in Japan Patent Application Nos. Tokuganhei 7-217034 and Tokuganhei 9-209536, filed by the inventor. The former prior art was a glass mirror system for industrial use, and especially, for electronic image acquiring systems. The latter prior art was a pair of foldaway orthogonal mirrors made of glass mirrors and holders.

Those prior arts used glass mirrors. Therefore, the exposed edges were possibly injurious in environments of consumer use and, especially, the latter complicated structures were costly.

OBJECTS OF THE INVENTIONS

An object of the present invention is to provide a pair of holdaway orthogonal mirrors with low cost and high safety, designed especially for consumer use, wherein the dually-reflected lights visualize reversed mirror images of a viewer's face or portrait in which the right and the left sides are correctly positioned.

Another object of the present invention is to provide a pair of orthogonal mirrors which have so simple a structure that they can be fabricated even by molding.

Yet another object of the present invention is to provide a pair of orthogonal mirrors with safe mirror edges.

Another, more particular, object of the present invention is to provide a pair of orthogonal mirrors held with a stand or a frame.

A further particular object of the present invention is to provide a pair of holdaway orthogonal mirrors which work as a planar mirror as well.

SUMMARY OF THE INVENTION

In accordance with a feature of the present invention, a pair of mirrors comprises two plates equipped with respectively silverized mirror surfaces, and also with plate connectors, which movably join both plates, enabling transition from an unfolded pose, where the mirror surfaces are arranged orthogonally, to a folded pose where the mirror surfaces face one another.

In accordance with another feature of the present invention, a pair of holdaway orthogonal mirrors comprises a frame; a first plate having a silverized surface and an external edge rotatably held with the frame; a second, wider plate having a silverized surface; and plate connectors, attached to respective mirror sides of both plates, which movably connect both plates, enabling transition from an unfolded pose where the mirror surfaces are arranged orthogonally, to a folded pose where the mirror surfaces face one another.

In accordance with another feature of the present invention, a fabrication method for fabricating a pair of orthogonal mirrors includes procedures wherein each of two orthogonally arranged planes of a solid is silverized to constitute a pair of orthogonal mirrors, wherein incident light is dual reflected and then emitted to present reversed mirror images of a viewer.

In accordance with yet another feature of the present invention, a fabrication method for fabricating a pair of orthogonal mirrors includes procedures wherein two silverized plates are arranged orthogonally with respect to one another so as to form a pair of orthogonal mirrors, wherein incident light is dually reflected and then emitted to present reversed mirror images of a viewer.

DETAILED DESCRIPTION OF THE EMBODIMENTS

Figure 1A:
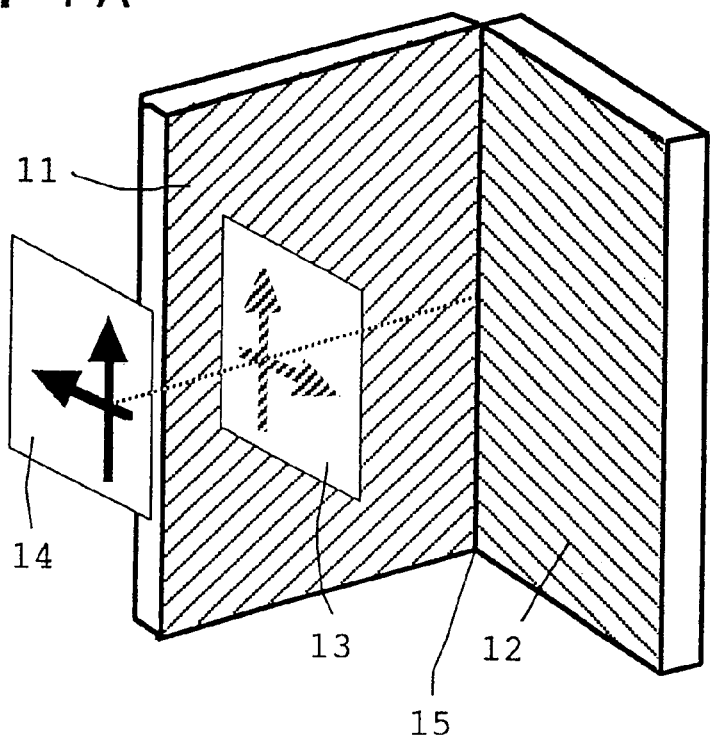
FIGS. 1A and 1B illustrate schematically the principle of action of a pair of orthogonal mirrors of the present invention—a schematic perspective view of the mirrors (FIG. 1A) and the dual reflection pathways (FIG. 1B)
Figure 1B:
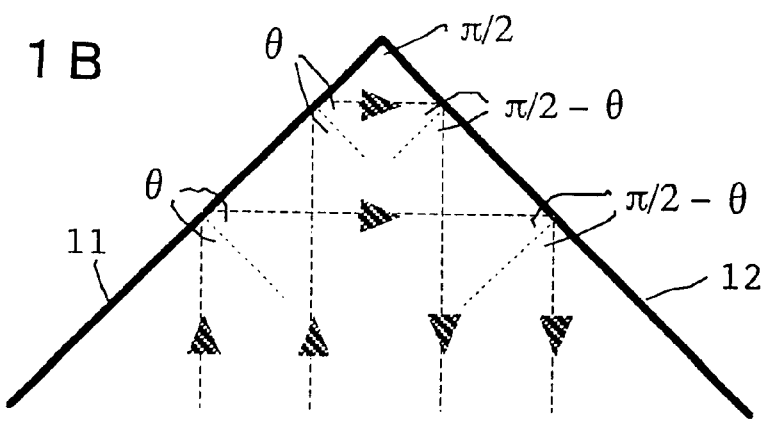

The function of a pair of orthogonal mirrors can be understood through the schematic illustrations shown in FIGS. 1A and 1B.

When one looks at oneself using an ordinary glass, one finds a false image of oneself, that is, the right and the left are reversed. Since an ordinary planar glass reflects structured light from an object with right angles, the right-to-left relations of the mirrored image are seen as reversed. It is called a "mirror image," as compared with a real image. It has been a recognized phenomenon from ancient times that one cannot see oneself as others do.

Shown in FIG. 1A is a schematic illustration of a pair of orthogonal mirrors, wherein two planar surface mirrors 11 and 12 are arranged orthogonally so that the surfaces might abut each other with the interior angle 15 of $\pi/2$. In the mirror arrangement shown schematically in FIG. 1B, primary light of an angle θ which is incident to the right mirror surface 11 is reflected, with an angle θ, and then hits the left mirror surface 12 as secondary incident light of an angle (π/2−θ), and is further reflected with an angle (π/2−θ).

Through dual reflection, a pair of orthogonal mirrors reverse mirror images, replacing the right with the left, and vice versa, correctly. Consequently, one 14 can look at one's own correct FIG. 13.

Here, it will be noted that the roles of both mirrors are quite similar, and they are interchangeable.

For the mirror 11 or 12, a surface mirror must be used. A surface mirror reflects light at the reflective obverse. On the other hand, an ordinary mirror reflects light at the inner face of the reverse. In the latter, light passes twice through the glass and is refracted twice at the air-glass interface. A pair of orthogonal mirrors essentially utilizes dual reflection steps. Therefore, if such an ordinary mirror is used in an embodiment of the present invention, the quadrupled refraction greatly degrades its image quality. Thus, an ordinary mirror cannot be adopted in the embodiments of the present invention.

The present invention provides several types of consumer-use orthogonal mirrors and fabrication methods thereof.

Figure 2:
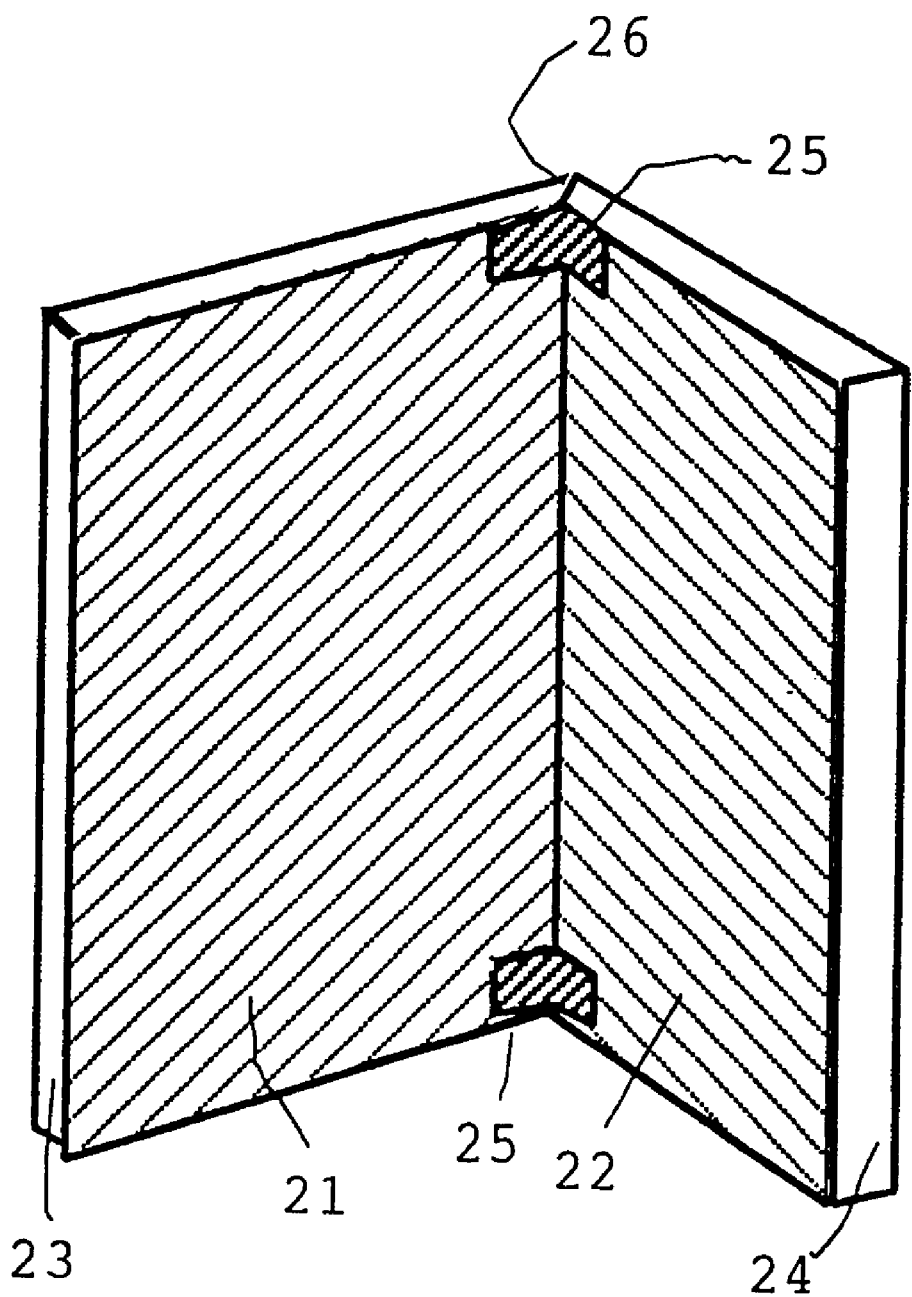
FIG. 2 is a schematic perspective view of an embodiment of the present invention.

An embodiment of the present invention is depicted schematically in FIG. 2. In the figure, one plate 23 having a mirror surface 21 is joined by means of hinges 25 to another plate 24 having a mirror surface 22 so that a user may fold and unfold the plates 23 and 24. The right mirror surface 21 has been obtained by silverizing the obverse of the plate 23, and the left mirror surface 22 has been obtained by silverizing the obverse of the plate 24. Because the contact of one mirror surface with another mirror edge is inevitable, to embody a pair of orthogonal mirrors, each internal side 26 of the plate 23, or the plate 24, is formed obliquely so that the mirror surfaces 21 and 22 may contact each other directly and orthogonally in the unfolded pose.

Figure 3C:
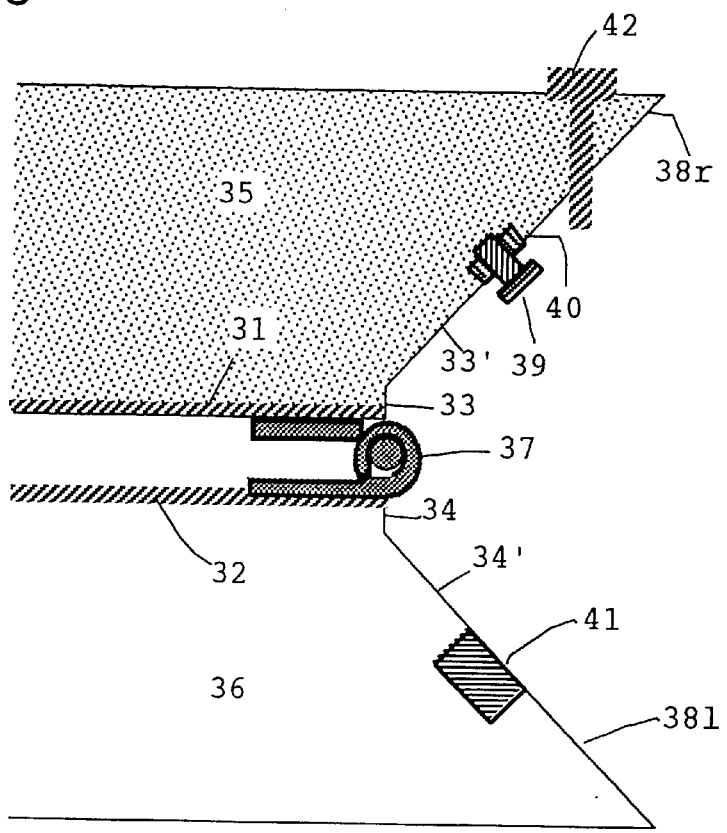
FIGS. 3C and 3D are schematic sectional plans of a pair of mirrors of an embodiment of the present invention in a folded pose (FIG. 3C) and an unfolded pose (FIG. 3D)
Figure 3D:
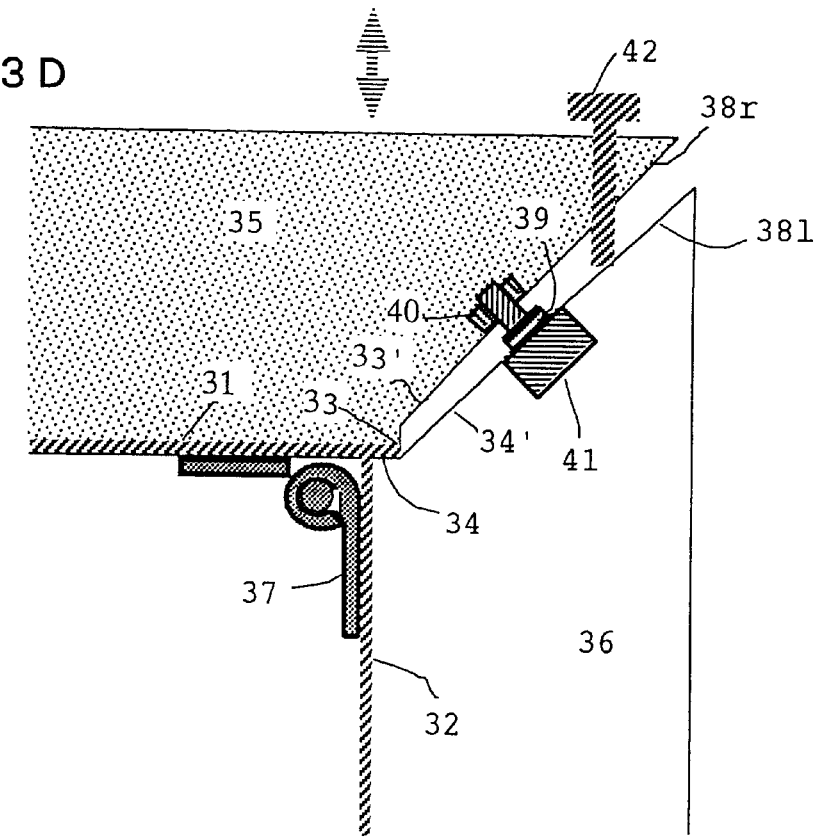

The embodiment is illustrated also in the schematic sectional plans of FIG. 3, where FIG. 3C is in the folded pose and FIG. 3D is in the unfolded pose. The size and the position of each part and the inclination angle of the oblique internal sides of both plates shown there is relative, and the number of each part is not necessarily unity.

In FIG. 3, the mirrors 31 and 32 have been made by silverizing the respective obverses of the plates 35 and 36 with Ag deposition, for example, by vacuum evaporation or by plating.

The respective internal sides 38r and 38l are partly orthogonal and partly oblique. Parts 33 and 34 are orthogonal to the respective mirror surfaces 31 and 32. Parts 33' and 34' are next to the respective orthogonal parts 33 and 34, and are oblique to the respective mirror surfaces 31 and 32. Owing to the shapes, the orthogonal part 34 of the plate 36 can meet closely with the mirror surface 31 of the plate 35 in the unfolded pose (FIG. 3D). Close contact of the mirror surface 31 with the orthogonal part 34 is a condition inevitable for keeping the unfolded orthogonal pose stable.

The slopes 33' and 34' have such inclination angles that the mirror surfaces 31 and 32 may be arranged orthogonally in the unfolded pose. In the embodiment of the present invention, the respective angles are obtuse with the mirror surfaces 31 and 32, so that, in the unfolded pose, a space is produced between both slopes 33' and 34' which enables intervention, between both plates 35 and 36, of unfolded pose-maintaining devices and interior angle adjusters to be mentioned subsequently (FIG. 3D).

The plate 35 is hinged to the plate 36 with hinges 37, so that one can fold and unfold both plates. Flaps of the hinges 37 are fixed adjacent to the respective inner edges of the obverses of the plates 35 and 36. Each flap is precisely positioned so as to attain the above-mentioned close contact of the mirrors 31 and 32. Although one hinge is illustrated in FIG. 3, in practice two hinges are used, as shown in FIG. 2.

The hinges 37 enable transition from the folded pose (FIG. 3C), where the mirrors 31 and 32 face each other, to the unfolded pose (FIG. 3D), where the mirrors 31 and 32 are arranged orthogonally. Rotation of the plate 35, or the plate 36, around the hinges 37 enables also folding of the unfolded mirrors. The hinges 37 may be positioned elsewhere so long as both surface mirrors 31 and 32 abut each other orthogonally.

Overall uniform planar contact of both mirror surfaces 31 and 32 and the 90 degree-angle intersection are definitive requisites for a pair of mirrors intended to produce correct reversal images. If either condition is lost, images will be degraded.

In order to establish a stable orthogonal arrangement this embodiment of the present invention has an unfolded pose-maintaining system with which both internal sides 38r and 38l may strike each other strongly.

Nuts (female screws) 40 are embedded in the internal side 38r, and magnetic bolts (male screws) 39 are screwed into the nuts 40. Magnets 41 are embedded in the internal side 38l. A combination of the magnets 41 and the magnetic bolts 39 produces a magnetic system which serves for stabilizing the unfolded mirrors. When one unfolds the mirrors, the magnets 41 approach the bolts 39 and pull them, and finally, the internal side 38l strikes the internal side 38r.

The magnetic system of magnets 41 and bolts 39 exactly reproduces just the orthogonal posture that has been precisely adjusted in the manufacturing line prior to delivery. Owing to magnetic attraction, users get rid of cumbersome adjustments in orthogonalizing both mirrors 31 and 32.

Prior to delivery, the intersecting angle must be adjusted to 90 degrees. In this embodiment of the present invention, lengths of the bolts 39 which are screwed out from the nuts 40 function as adjustable spacers inserted between the internal sides 38r and 38l.

Fine adjustment of the intersection angle between the mirror surfaces 31 and 32 is achieved by screwing the bolts 39. In a contact pose of the mirror surfaces 31 and 32 (FIG. 3D), an operator screws up or down the bolts 39 until the separate right and left images unite into one coordinated figure. Once the coordination is accomplished, the operator fixes the bolts 39 to the respective nuts 40 using a fixing agent. The fixed bolts 39 guarantee the reproducibility of orthogonal intersection established between the mirror surfaces 31 and 32, even when an innocent user would unfold the mirrors carelessly.

The adjuster does not need to be a combination of bolts and nuts. Any space adjuster whatever can be used. As is shown in FIG. 3D, similar adjuster effect can be obtained with male screws 42 which are screwed directly into the plate 35 from the reverse to cause the tips to push the internal side 38l.

In this embodiment of the present invention, a transparent material such as uncolored polycarbonate or acryl resin is used for the plate 36, so that the opposite side of the mirror 32 works as a usual planar mirror with which one can see accustomed self images for make-up and other uses.

Figure 4E:
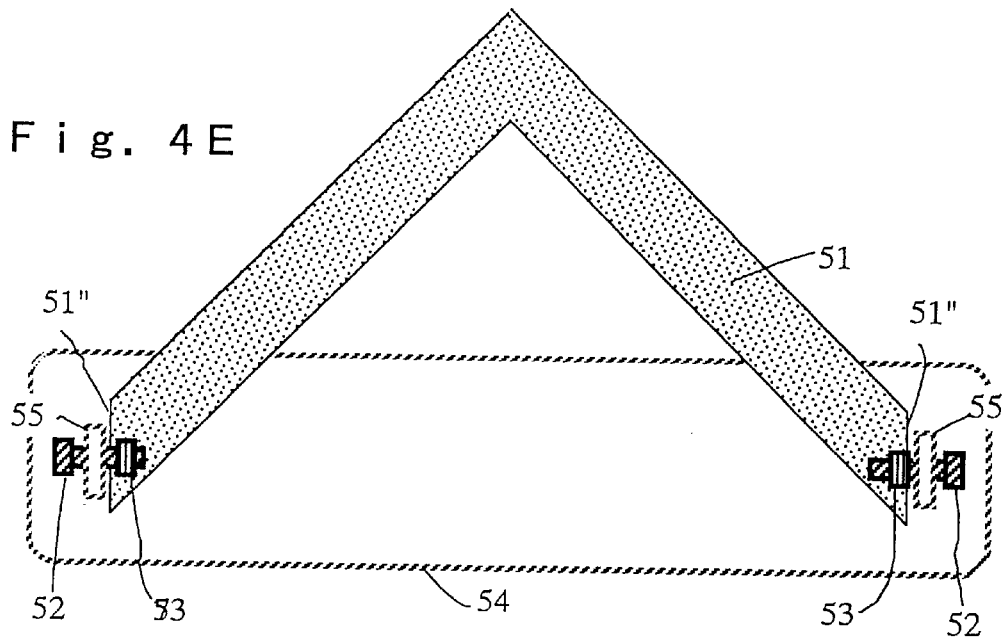
FIGS. 4E and 4F are a schematic top view (FIG. 4E) and a schematic front view (FIG. 4F) of a pair of orthogonal mirrors held with a stand of another embodiment of the present invention.
Figure 4F:
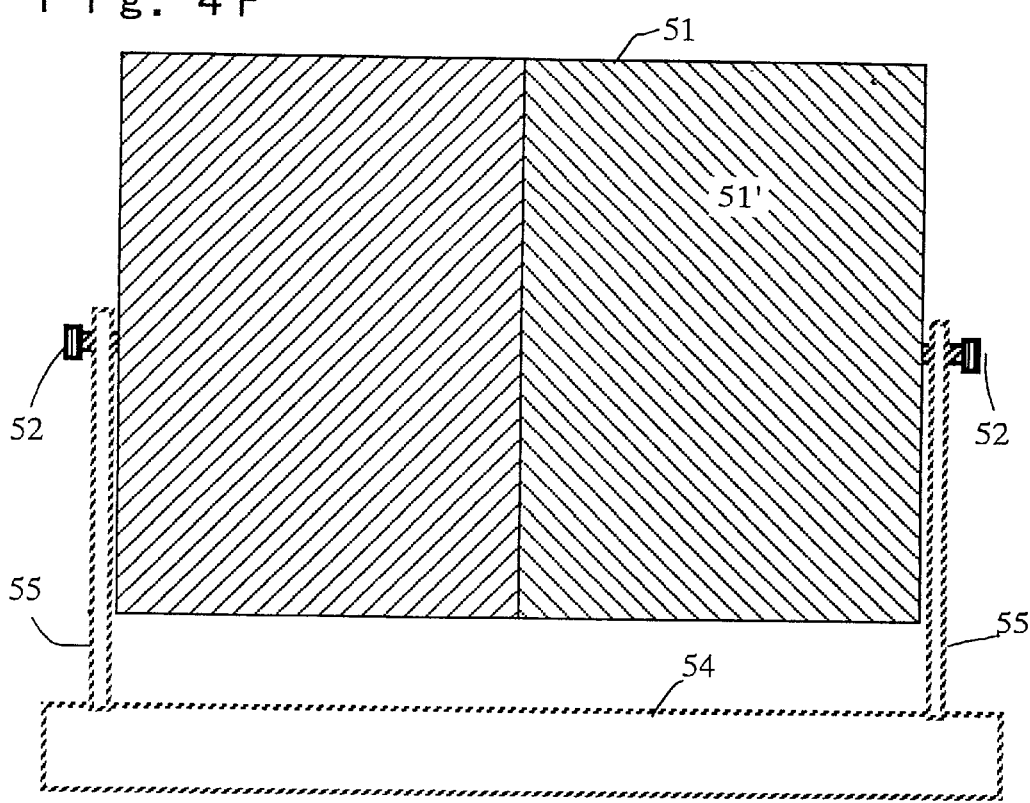

FIG. 4 illustrate another embodiment of the present invention, wherein use of a pair of orthogonal mirrors with no hand-hold for make-up and other uses is realized. Another embodiment is equipped with a stand which supports a pair of orthogonal mirrors. FIG. 4E is a top view of the stand supporting a pair of orthogonal mirrors, and FIG. 4F is a front view of it.

A pair of orthogonal mirrors 51 with a structure similar to that shown in FIG. 3 is supported with a pair of arms 55 of a stand 54. The pair of orthogonal mirrors 51 has oblique external sides 51" whose angles are 45 degrees with the mirror 51. Nuts 53 are embedded in the external sides 51". Bolts 52 are screwed into the nuts 53 via holes (not shown) of the arms 55, and then the pair of orthogonal mirrors 51 is supported with the stand 54 rotatably. One can place the stand 54, for example, on a desk and turn the mirror surface 51' to an up or down angle most feasible for gazing at one's facial image.

Yet another embodiment of the present invention is illustrated in FIG. 5. This embodiment is a method for manufacturing a pair of orthogonal mirrors.

Figure 5G:
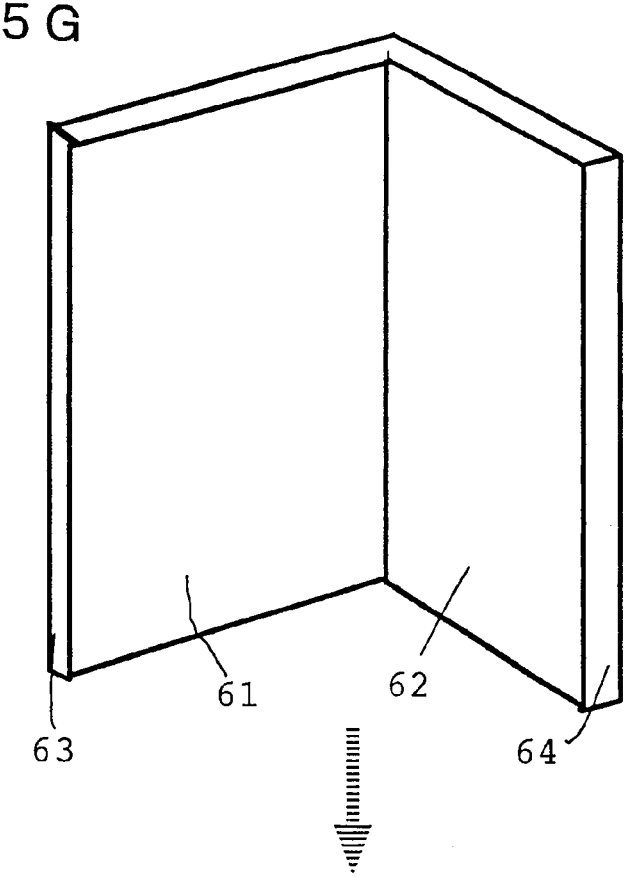
FIGS. 5G and 5H are a schematic diagram of a manufacturing process for a pair of orthogonal mirrors in accordance with the present invention illustrating an example of the fabrication method.

In the first step of its fabrication, a solid with orthogonally contacting surfaces 61 and 62 is made as a basal body for a pair of orthogonal mirrors, as shown in FIG. 5G. Whereas the solid in FIG. 5G is depicted as if it had been made by orthogonal intersection of one plate 63 with another plate 64, crossing of two plates is not inevitable for the basal body. The only requisite for the basal body is the possession of the orthogonally intersecting planar surfaces 61 and 62. The basal body may also be produced using a mold.

Figure 5H:
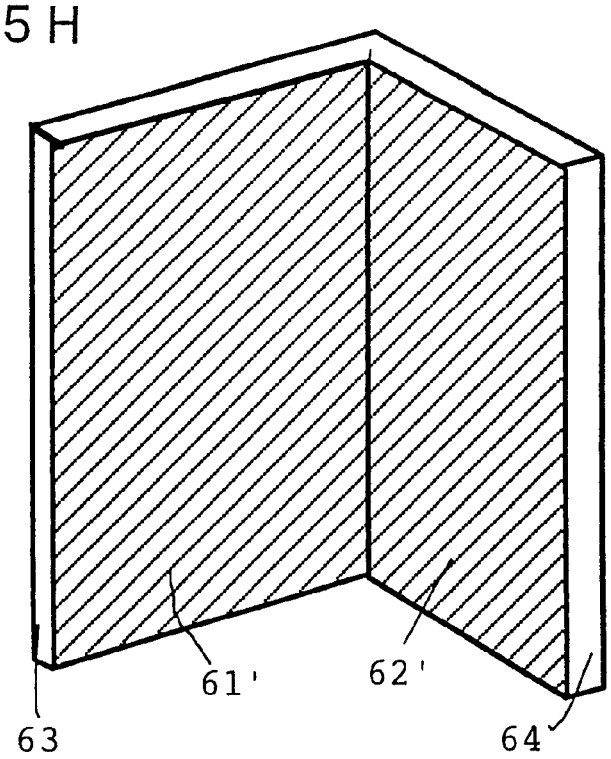

In the second step, a pair of orthogonal mirrors is accomplished by silverizing the surfaces 61 and 62 with Ag evaporation, and others, to obtain the respective surface mirrors 61' and 62' (FIG. 5H). Silverizing the contact regions of the surfaces 61 and 62 is inevitable.

In this embodiment, equipping the pair of orthogonal mirrors with a stand 54, as shown in FIG. 4, enables orientation of the mirror surfaces 61' and 62' to an angle favorable for looking.

Still another embodiment of the present invention is illustrated in FIG. 6. This embodiment is another method for manufacturing a pair of orthogonal mirrors.

Figure 6J:
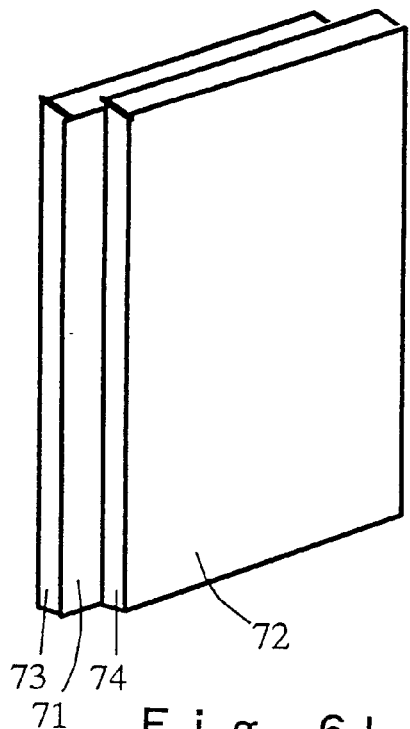
FIGS. 6J, 6K and 6L are a schematic diagram of a manufacturing process for a pair of orthogonal mirrors in accordance with the present invention, illustrating an example of another fabrication method.

In the first step of its fabrication, two separate solids 73 and 74, having respective flat surfaces 71 and 72, as shown in FIG. 6J, are prepared. Whereas the solids 73 and 74 are depicted as if they were two plates in FIG. 6J, plates are not inevitable for the basal bodies. The only requisite for the basal body is the planar front surface of 71 and 72.

Figure 6K:
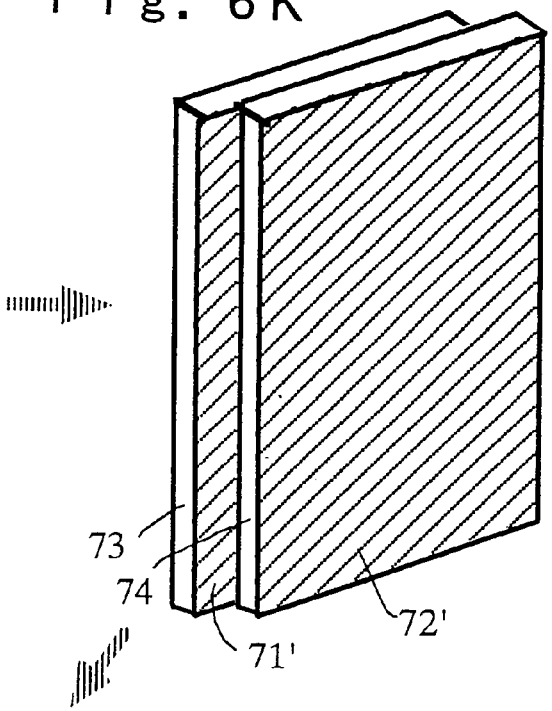

The second step is a silverizing process of the surfaces 71 and 72, with Ag evaporation, and others, to produce surface mirrors 71' and 72' (FIG. 6K).

Figure 6L:
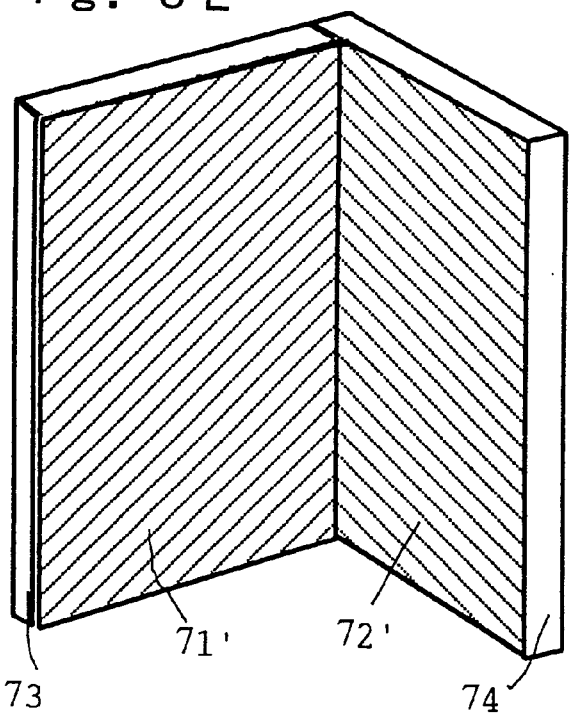

The third is a step of joining the mirror 71' to the mirror 72', keeping an orthogonally intersecting pose between both surfaces (FIG. 6L).

In this embodiment also, equipping the pair of orthogonal mirrors 71' and 72' with a stand 54, as shown in FIG. 4, enables orientation of the surfaces 71' and 72' to an angle favorable for looking.

Yet still another embodiment of the present invention is illustrated as sectional plans (in FIG. 7), and as frontal views (in FIG. 8), of a pair of orthogonal mirrors in a folded pose or in an unfolded pose. This embodiment is a large pair of foldaway orthogonal mirrors enabling wall-hanging or standing-alone as a professional-use looking glass.

Figure 7M:
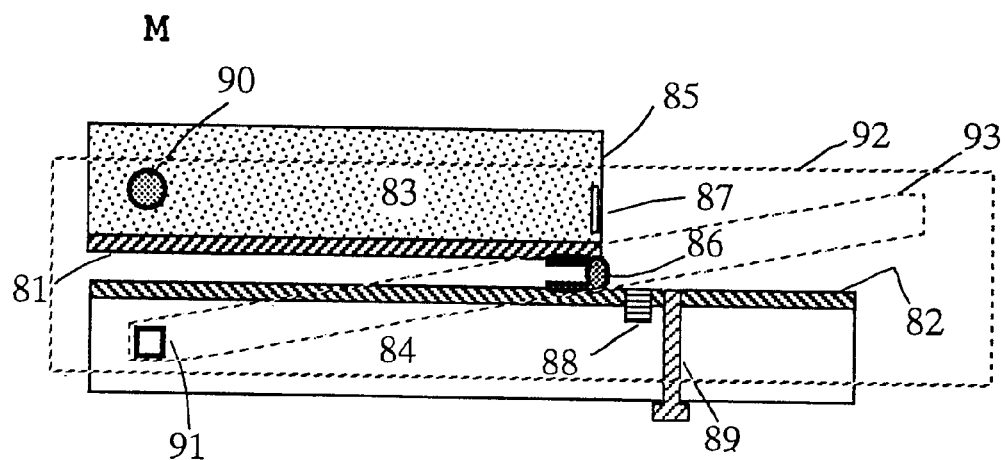
FIGS. 7M and 7N are schematic sectional plans of a pair of orthogonal mirrors held with a frame of yet another embodiment of the present invention in a folded pose (FIG. 7M), and in an unfolded pose (FIG. 7N)
Figure 7M:

As is shown in FIG. 7, a right surface mirror 81 has been made by silverizing a face of one plate 83, with Ag evaporation, and others, and a left surface mirror 82 has been obtained through similar processing of a face of another transparent plate 84. Owing to the wall-hanging or standing-alone style, users would hardly touch the mirror edges. Therefore, the plate 83 and/or the plate 84 can be made of glass as well as synthetic resin.

In this embodiment, the external edge of the right plate 83 is rotatably connected to a frame 92 with a fixed pivot 90. Hinges 86 work as floating pivots.

The left plate 84 is held with the right plate 83 via the hinges 86. Either edge of the left plate 84 is free.

Figure 8P:
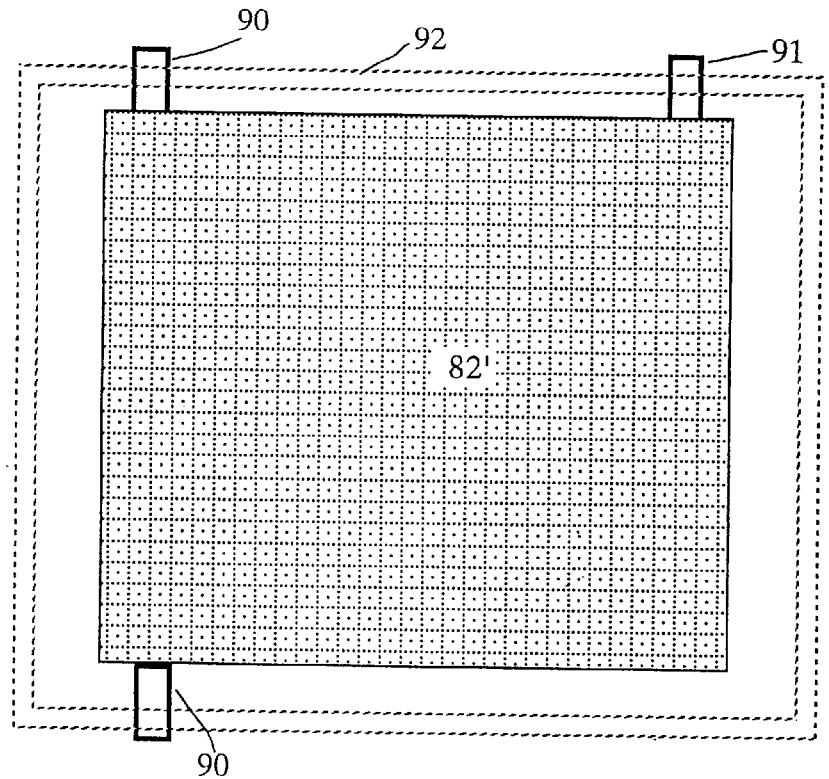
FIGS. 8P and 8Q are schematic front views of a pair of orthogonal mirrors illustrated in FIG. 7 in a folded pose (FIG. 8P), and in an unfolded pose (FIG. 8Q)

In the folded pose of FIG. 7M, the reverse of the left plate 84 is oriented to the front as is shown also in FIG. 8P. Owing to the transparency, the reverse 82' of the left mirror 82 works as a planar mirror (FIG. 8P).

Figure 7N:
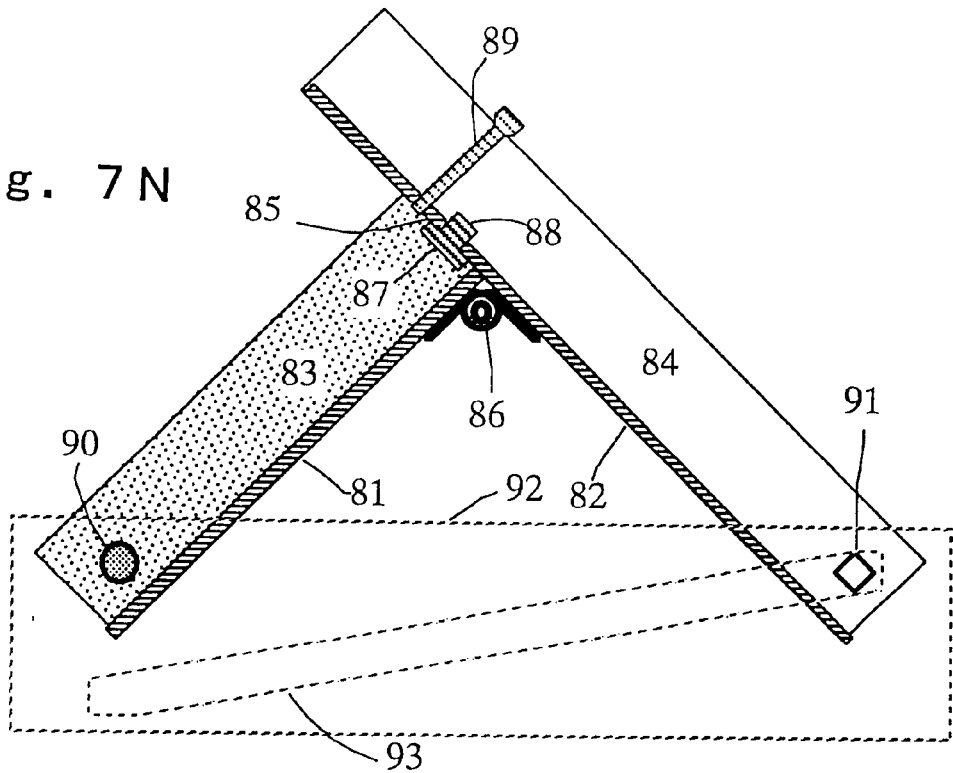
Figure 8Q:
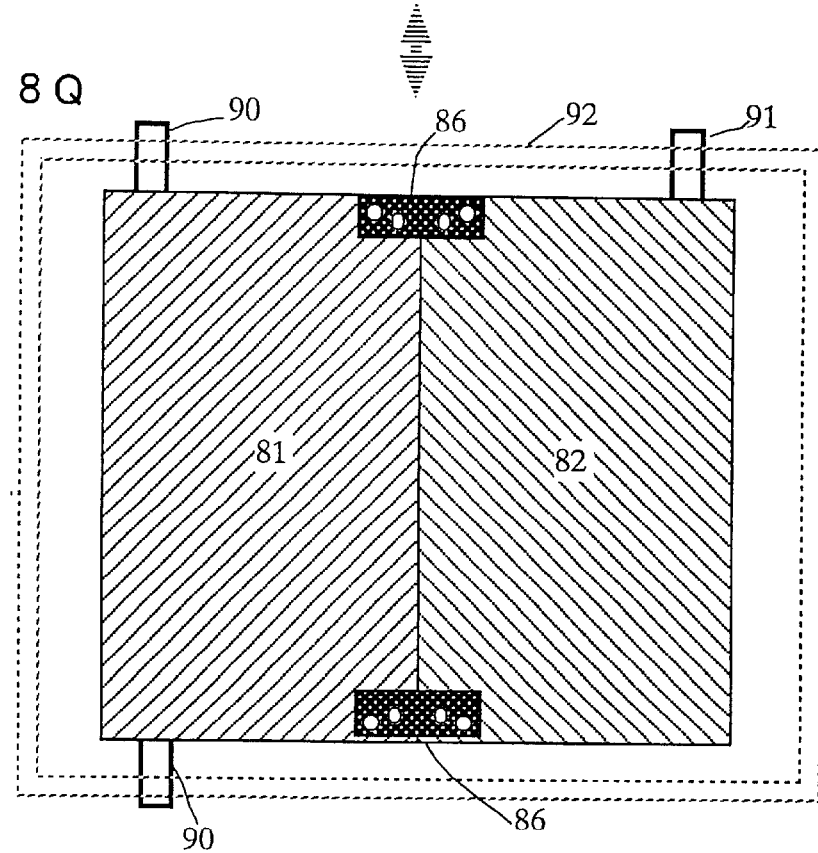

In the folded pose of FIG. 7M, moving a projection 91 of the left plate 84 along an aperture guide 93 opened obliquely in the top of the frame 92 causes both plates 83 and 84 to rotate around the fixed pivot 90, and further causes both mirrors 81 and 82 to unfold around the hinges 86. In this movement, the right mirror 81 rotates by 45 degrees and the left mirror 82 rotates by 135 degrees. A pair of orthogonal mirrors of this embodiment is thus attained as is shown in FIG. 7N and FIG. 8Q. The projection 91 may be moved either manually or electrically.

The left plate 84 is wider than the right plate 83. The unfolded pose of FIG. 7N is obtained by bringing the internal side 85 of the right plate 83 into contact with the mirror surface 82 of the left plate 84. For vertical contact of the mirror 81 with the mirror 82, the internal side 85 of the right plate 83 has been made vertical to the right mirror surface 81.

The plate 83 is hinged to the plate 84 with hinges 86, so that one can fold and unfold both plates. Respective flaps of the hinges 86 are so fixed to the obverses of the plates 83 and 84 as to yield a minute space between the side 85 and the obverse of the plate 84 permitting intervention of an unfolded pose-maintaining system and an interior angle adjuster to be mentioned subsequently.

This embodiment of the present invention is equipped with an unfolded pose-maintaining system, wherein pieces of magnetic material 87 are embedded in the internal side 85 of the right plate 83 and magnets 88 are also embedded in the obverse of the left plate 84. A combination of the magnets 88 and the magnetic pieces 87 produces a magnetic system which serves for stabilizing the unfolded mirrors. When one unfolds the errors 81 and 82, the magnets 88 approach the pieces 87, and pull them, and finally the obverse of the left plate 84 strikes the internal side 85, thus reproducing just the orthogonal posture that has been precisely adjusted, prior to delivery, in the manufacturing process.

Magnetic action is not necessarily required for maintaining the unfolded pose. Similar effect can be obtained using an elastic material. For example, by fixing one end of a slightly stretched spiral spring to the external edge of the right plate 83, and by fixing the other end of it to the internal edge of the left plate 84, the external edge of the right plate 83 forcibly attracts the internal edge of the left plate 84, and finally the obverse of the left plate 84 strikes the internal side 85.

To attain a precise intersection angle of 90 degrees, as is depicted in FIG. 7N, this embodiment of the present invention is equipped with adjustable spacers. Bolts or male screws 89 are screwed into the left plate 84 from the reverse, and the tips protrude from the obverse, pushing the internal side 85 of the right plate 83. By screwing up or down the bolts or male screws 89, fine adjustment of the intersection angle is achieved.

Figure 9R:
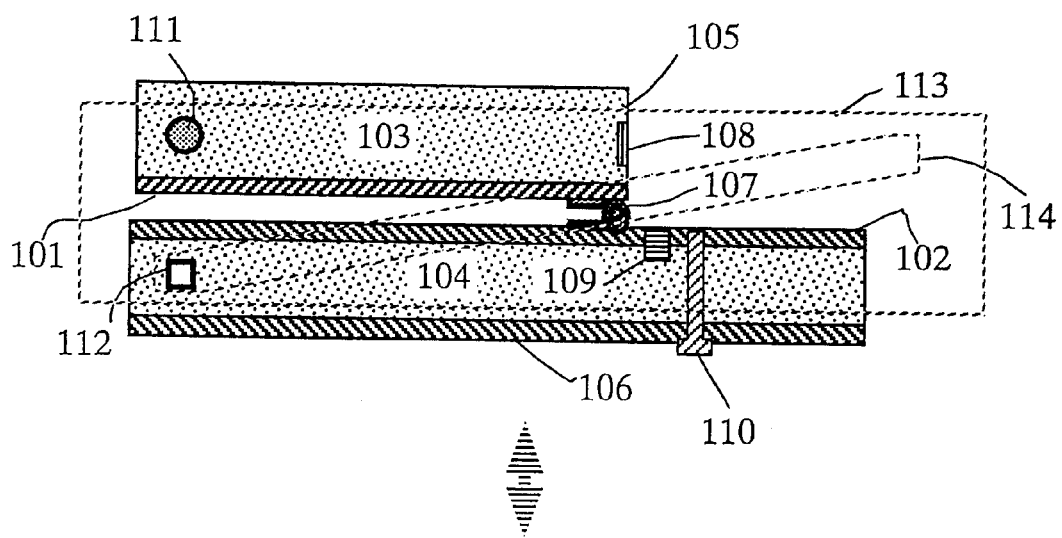
FIGS. 9R and 9S are schematic sectional plans of a pair of orthogonal mirrors of still another embodiment of the present invention in a folded pose (FIG. 9R) and in an unfolded pose (FIG. 9S).
Figure 9S:
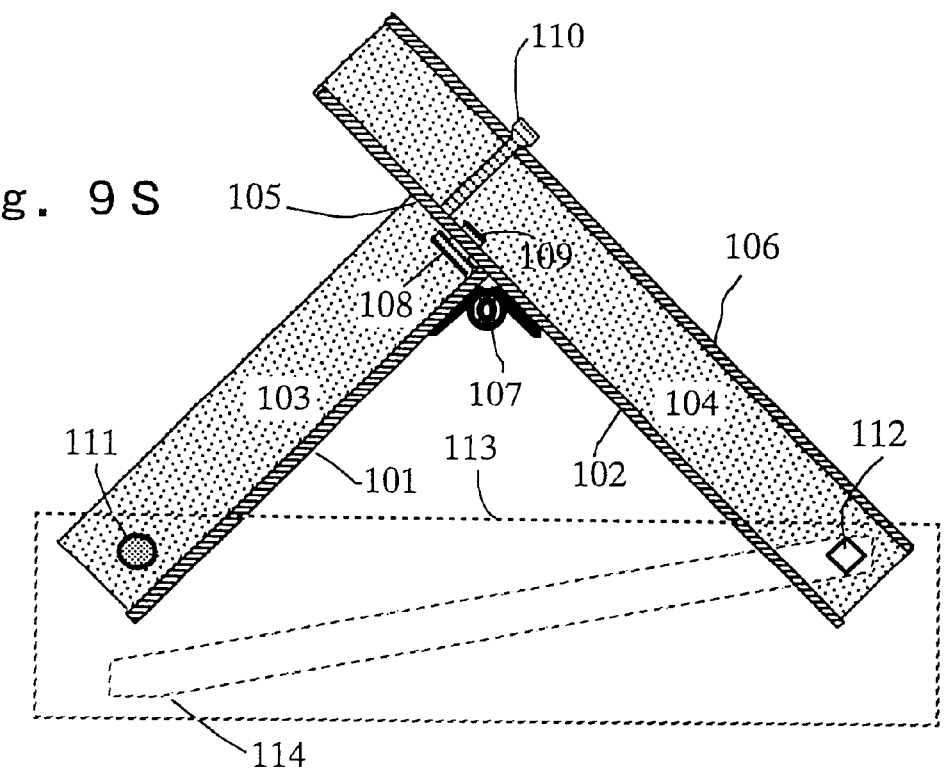

A further embodiment of the present invention concerning a pair of orthogonal mirrors is illustrated as sectional plans of a folded pose or an unfolded pose in FIG. 9. Similar to a pair of orthogonal mirrors depicted in FIG. 7, this embodiment is a large pair of foldaway orthogonal mirrors enabling wall-hanging or standing-alone as a professional-use looking glass.

Except that the reverse 106 of the left plate 104 can be utilized for a planar mirror, this embodiment has basically a similar structure as that shown in FIG. 7. Thus, explanation of the similar factors is as follows: the fixed pivot 111 corresponds to fixed pivot 90 of FIG. 7; projection 112 corresponds to projection 91 of FIG. 7; plates 103, 104 correspond to plates 83, 84 of FIG. 7; internal side 105 corresponds to internal side 85 of FIG. 7, while frame 113, aperture guide 114 and screw 110 correspond to the structure at numerals 92, 93 and 89, respectively, and magnets 108, 109 correspond to magnets 87, 88 of FIG. 7. Finally, hinge 107 corresponds to hinge 86 of FIG. 7. As is shown in FIG. 9, a right mirror surface 101 has been made by silverizing a face of a right plate 103, with Ag evaporation, and others, and a left obverse mirror surface 102 and a left reverse mirror surface 106 have been obtained through similar processing of both faces of the left plate 104. In the folded pose of FIG. 9R, where the reverse 106 of the left plate 104 is oriented to the front, the silverized face 106 can be used as a planar mirror.

What is claimed is:

1. A pair of folding orthogonal mirrors, comprising:
   a first plate and a second plate, each provided on a face thereof with a surface mirror;
   hinges, attached to the first and second plates, for movably joining the plates, so that the plates are movable from an unfolded position, in which the surface mirrors on each of the plates are arranged orthogonally, to a folded position, in which the surface mirrors on each of the plates face one another,
   a magnet assembly, attached to the first and second plates, for maintaining the plates in the unfolded position by magnetic attraction; and
   means for adjusting the angle between the surface mirrors in the unfolded position.

2. The pair of folding orthogonal mirrors according to claim 1, wherein an internal edge of each of the plates adjacent one another is provided with an orthogonal part, relative to the surfaces of the respective plates, on a portion of the first and second plates where each is joined to the other by the hinges; and is provided with an oblique part, relative to the surfaces of the respective plates, enabling stable orthogonal arrangement of the mirrors in the unfolded position through contact of the orthogonal part of one plate with the mirror surface of another plate, thus preventing a center line split between the surface mirrors.

3. The pair of folding orthogonal mirrors according to claim 2, wherein the magnet assembly comprises:
   a nut, embedded in an internal edge of one of the first and second plates;
   a magnetic bolt, held by the nut; and
   a magnet, embedded in the other of the first and second plates,
   wherein the magnetic bolt contacts the magnet, when the pair of mirrors are in the unfolded position, to maintain the pair of mirrors in the unfolded position by magnetic attraction.

4. The pair of folding orthogonal mirrors according to claim 3, wherein the means for adjusting the angle between the surface mirrors comprises the magnetic bolt and the nut, and wherein the angle between the surface mirrors is adjusted by displacing the magnetic bolt within the nut by rotation of the bolt.

5. The pair of folding orthogonal mirrors according to claim 3, wherein the means for adjusting the angle between the surface mirrors comprises a screw, screwed into one of the first and second plates, on a face opposite that of the surface mirror, such that the screw protrudes from the one of the first and the second plates and contacts an internal edge of the other of the first and second plates, and wherein the angle between the surface mirrors is adjusted by displacing the screw by rotation to vary a length of the screw which protrudes from the one of the first and second plates to contact the internal edge of the other of the first and second plates.

6. The pair of folding orthogonal mirrors according to claim 1, further comprising a stand, rotatably supporting the first and second plates in the unfolded position.

7. The pair of folding orthogonal mirrors according to claim 1, wherein the pair of orthogonal mirrors dually reflect incident light and emit incident light in a parallel but inverse direction.

8. The pair of folding orthogonal mirrors according to claim 7, wherein each of the first and second plates are provided on external edges thereof with means for attaching a stand to the external edges to rotatably support the mirrors in the unfolded position.

9. A method of reflecting light with the pair of folding orthogonal mirrors according to claim 1, comprising:
   providing an orthogonal arrangement of the surface mirrors to form an angle of $\pi/2$;
   providing primary light, entering at an angle $\theta$, which is incident to one of the surface mirrors;
   reflecting the light from the one of the surface mirrors, with an angle $\theta$, toward the other of the surface mirrors, such that the light hits the other of the surface mirrors as secondary incident light having an angle $\pi/2-\theta$; and
   reflecting the light from the other of the surface mirrors at an angle $\pi/2-\theta$.

* * * * *